United States Patent
Vaarno et al.

(10) Patent No.: US 9,731,222 B2
(45) Date of Patent: *Aug. 15, 2017

(54) SOLVENT EXTRACTION SETTLER ARRANGEMENT

(71) Applicant: OUTOTEC (FINLAND) OY, Espoo (FI)

(72) Inventors: Jussi Vaarno, Sundsberg (FI); Rami Saario, Espoo (FI); Henri Fredriksson, Helsinki (FI)

(73) Assignee: Outotec (Finland) Oy, Espoo (FI)

( * ) Notice: Subject to any disclaimer, the term of this patent is extended or adjusted under 35 U.S.C. 154(b) by 22 days.

This patent is subject to a terminal disclaimer.

(21) Appl. No.: 14/408,703

(22) PCT Filed: Jun. 12, 2013

(86) PCT No.: PCT/FI2013/050640
§ 371 (c)(1),
(2) Date: Dec. 17, 2014

(87) PCT Pub. No.: WO2014/001622
PCT Pub. Date: Jan. 3, 2014

(65) Prior Publication Data
US 2015/0190734 A1    Jul. 9, 2015

(30) Foreign Application Priority Data
Jun. 26, 2012  (FI) ...................................... 20125717

(51) Int. Cl.
*B01D 11/04* (2006.01)
*B01D 17/032* (2006.01)
(Continued)

(52) U.S. Cl.
CPC ...... *B01D 17/0208* (2013.01); *B01D 11/0449* (2013.01); *B01D 11/0484* (2013.01);
(Continued)

(58) Field of Classification Search
CPC ............ B01D 11/0449; B01D 11/0453; B01D 11/0484; B01D 17/0208; B01D 17/0211; B01D 17/0214; C22B 3/02
(Continued)

(56) References Cited

U.S. PATENT DOCUMENTS 2,258,982 A    12/1938  Gordon et al.
2,728,457 A *  12/1955  Clarke ............... B01D 11/0453
                                                  210/521
(Continued)

FOREIGN PATENT DOCUMENTS

CN    1216932 A    5/1999
CN    1216933 A    5/1999
(Continued)

OTHER PUBLICATIONS

Finnish Search report from priority Finnish Application No. 20125717, dated Apr. 19, 2013, 1 pg.
(Continued)

*Primary Examiner* — Christopher Upton
(74) *Attorney, Agent, or Firm* — Chernoff, Vilhauer, McClung & Stenzel LLP

(57) ABSTRACT

A solvent extraction settler arrangement comprises a settler (1) having a feed end (2) and a discharge end (3), said settler being arranged to separate solution phases from a dispersion fed from the feed end while the dispersion flows to the discharge end. Elongated discharge launders (4, 5) are arranged at the discharge end (3) of the settler for each solution phase to be separated from the dispersion, each discharge launder (4, 5) including a first end (6), an outlet (7, 8) arranged at the first end, and a closed second end (9). At least one of the discharge launders (4, 5) has a form of a conical tube with a cross-section converging from the first end (6) towards the second end (9) and an inclined bottom (Continued)

(10, 11) descending from the second end (9) towards the first end (6).

11 Claims, 4 Drawing Sheets

(51) Int. Cl.
    *B01D 17/02*     (2006.01)
    *C22B 3/02*     (2006.01)

(52) U.S. Cl.
    CPC ............ *B01D 17/0214* (2013.01); *C22B 3/02* (2013.01); *Y02P 10/234* (2015.11)

(58) Field of Classification Search
    USPC ....................... 210/511, 532.1, 533, 536, 540
    See application file for complete search history.

(56) References Cited

U.S. PATENT DOCUMENTS

| | | | |
|---|---|---|---|
| 2,868,384 | A | 1/1959 | Puddington |
| 3,419,145 | A | 12/1968 | De Cells |
| 3,544,079 | A | 12/1970 | Dressler |
| 4,218,311 | A | 8/1980 | Newrick |
| 4,294,702 | A | 10/1981 | Finsterwalder |
| 4,476,018 | A | 10/1984 | White et al. |
| 4,747,978 | A | 5/1988 | North |
| 5,083,400 | A | 1/1992 | Nyman et al. |
| 5,103,641 | A | 4/1992 | Maus et al. |
| 5,132,615 | A | 7/1992 | Nyman et al. |
| 5,176,608 | A | 1/1993 | Nyman et al. |
| 5,185,081 | A | 2/1993 | Nyman et al. |
| 5,266,191 | A | 11/1993 | Greene et al. |
| 5,435,924 | A * | 7/1995 | Albertson ............... B01D 21/06 210/525 |
| 5,552,050 | A * | 9/1996 | Valentin ............. B01D 21/2405 210/540 |
| 5,558,780 | A * | 9/1996 | Vancas ............... B01D 17/0208 210/532.1 |
| 5,585,008 | A | 12/1996 | Ilg et al. |
| 5,662,861 | A | 9/1997 | Taylor |
| 5,662,871 | A | 9/1997 | Nyman et al. |
| 6,245,243 | B1 | 6/2001 | Meurer |
| 6,267,900 | B1 | 7/2001 | Nyman et al. |
| 6,432,370 | B1 | 8/2002 | Nyman et al. |
| 6,558,558 | B1 | 5/2003 | Hall |
| 6,977,038 | B2 | 12/2005 | Jowett |
| 7,390,420 | B2 | 6/2008 | Nyman et al. |
| 7,507,343 | B2 * | 3/2009 | San Lorenzo ..... B01D 17/0208 210/511 |
| 7,517,461 | B2 | 4/2009 | Nyman et al. |
| 7,611,635 | B2 | 11/2009 | Chieng et al. |
| 7,731,853 | B2 | 6/2010 | Ekman et al. |
| 2005/0040106 | A1 | 2/2005 | Gigas et al. |
| 2006/0113246 | A1 | 6/2006 | Ekman et al. |
| 2007/0263486 | A1 | 11/2007 | Suhner |
| 2010/0051548 | A1 | 3/2010 | Dorlac et al. |
| 2011/0236152 | A1 | 9/2011 | Lu et al. |
| 2011/0297606 | A1 | 12/2011 | Vaarno |
| 2011/0303619 | A1 | 12/2011 | Nyman et al. |
| 2012/0171006 | A1 | 7/2012 | Berry et al. |
| 2014/0110359 | A1* | 4/2014 | Haywood ........... B01D 17/0214 210/521 |
| 2015/0151218 | A1 | 6/2015 | Vaarno et al. |
| 2015/0151460 | A1 | 6/2015 | Saario et al. |
| 2015/0159236 | A1* | 6/2015 | Vaarno ............... B01D 11/0484 266/170 |
| 2015/0182874 | A1 | 7/2015 | Vaarno et al. |
| 2015/0190732 | A1 | 7/2015 | Vaarno et al. |
| 2015/0190734 | A1 | 7/2015 | Vaarno et al. |
| 2015/0232960 | A1 | 8/2015 | Vaarno et al. |
| 2016/0130681 | A1* | 5/2016 | Vaarno ............... B01D 17/0214 210/511 |

FOREIGN PATENT DOCUMENTS

| | | |
|---|---|---|
| CN | 2480439 | 3/2002 |
| CN | 1652853 A | 8/2005 |
| CN | 1652855 A | 8/2005 |
| CN | 2748146 Y | 12/2005 |
| CN | 1805773 A | 7/2006 |
| CN | 201071566 Y | 6/2008 |
| CN | 101449012 B | 6/2009 |
| CN | 201366254 Y | 12/2009 |
| CN | 102292133 A | 12/2011 |
| CN | 202128943 Y | 2/2012 |
| DE | 3704326 A1 | 8/1988 |
| EP | 0156699 A1 | 10/1985 |
| EP | 0973595 B1 | 9/2001 |
| EP | 2019890 A1 | 2/2009 |
| EP | 2114548 A2 | 11/2011 |
| GB | 835912 | 5/1960 |
| GB | 2476102 A | 6/2011 |
| JP | 2001029703 | 2/2001 |
| WO | 9740899 | 11/1997 |
| WO | 9740900 | 11/1997 |
| WO | 9740901 A1 | 11/1997 |
| WO | 9741938 | 11/1997 |
| WO | 0074895 A1 | 12/2000 |
| WO | 03097207 A1 | 11/2003 |
| WO | 2007135221 A1 | 11/2007 |
| WO | 2008094151 A1 | 8/2008 |
| WO | 2009004321 A2 | 1/2009 |
| WO | 2009063128 A1 | 5/2009 |
| WO | 2010089462 A1 | 8/2010 |
| WO | WO 2010/097516 * | 9/2010 |
| WO | 2010131982 A2 | 11/2010 |
| WO | 2011113110 A1 | 6/2011 |
| WO | 2011088516 A1 | 7/2011 |
| WO | 2012026345 A1 | 3/2012 |

OTHER PUBLICATIONS

International Search report from corresponding International Application No. PCT/FI2013/050640, mailed Sep. 20, 2013, 3 pgs.
State Intellectual Property Office of the Peoples Republic of China, Office action issued in application No. 201380037888.X, Dec. 3, 2015, 6 pages, Beijing, China.
International Searching Authority of WIPO, Written Opinion of the International Searching Authority issued in application No. PCT/FI2013/050640, Sep. 20, 2013, Geneva, Switzerland.
European Patent Office, Extended Search Report issued in application No. 13810173.8, Mar. 17, 2016, Munich, Germany.
Canadian Intellectual Property Office; Office Action issued in Application No. 2,875,939; Sep. 15, 2015; 4 pgs.; Montreal, Quebec, Canada.
European Patent Office, Extended European Search Report issued in application No. 13808497, Feb. 11, 2016, 9 pages, European Patent Office, Munich, Germany.
European Patent Office; Extended European Search Report issued in application No. 13810718.0; Mar. 7, 2016; 6 pages; Munich, Germany.
European Patent Office, Extended European Search Report issued in application No. 13809197.0, Mar. 21, 2016, 9 pages, Munich, Germany.
European Patent Office; Extended European Search Report issued in application No. 13809503.9; Mar. 17, 2016; 6 pages; Munich, Germany.
European Patent Office; Partial Supplementary European Search Report issued in application No. 13810326.2; Apr. 25, 2016; 6 pages; Munich, Germany.
Finnish Search report from priority Finnish Application No. 20125712, dated Apr. 8, 2013, 1 pg.
Finnish Search report from priority Finnish Application No. 20125714, dated Apr. 8, 2013., 1 pg.
Finnish Search report from priority Finnish Application No. 20125715, dated Apr. 16, 2013, 1 pg.
Finnish Search report from priority Finnish Application No. 20125718, dated Apr. 19, 2013, 1 pg.

(56) References Cited

OTHER PUBLICATIONS

Finnish Patent and Registration Office, Opinion on Patentability issued in Application No. 20125714, Jan. 21, 2016, Helsinki, Finland.
International Bureau of WIPO, International Preliminary Report on Patentability w/attached Written Opinion of the International Searching Authority issued in pending PCT application No. PCT/FI2013/050641, Dec. 31, 2014, 7 pages, World Intellectual Property Organization Geneva, Switzerland.
International Bureau of WIPO, International Preliminary Report on Patentability w/attached Written Opinion of the International Searching Authority, issued in pending PCT application PCT/FI2013/050638, Dec. 31, 2014, 6 pages, World Intellectual Property Organization, Geneva, Switzerland.
International Search report from corresponding International Application No. PCT/FI2013/050637, mailed Oct. 9, 2013, 3 pgs.
International Search report from corresponding International Application No. PCT/FI2013/050638, mailed Sep. 20, 2013, 3 pgs.
International Search report from corresponding International Application No. PCT/FI2013/050639; mailed Nov. 27, 2013, 6 pgs.
International Search report from corresponding International Application No. PCT/FI2013/050641, mailed Sep. 7, 2013, 3 pgs.
Miller, Graeme, Design of Mixer-Settlers to Maximize Performance:, Miller Metallurgical Services, ALTA COPPER-10, May 2006, 26 pgs.
Plastic Moulding Process, Jiang Shui Qing, Li Hai Ling, Chemical Industry Publishing House, Aug. 31, 2009, pp. 172-173, Figs. 9-11.
R.J. Crawford and M.P. Kearns, Queens' University, Belfast, Introduction to the Rotational Moulding Process:, Practical Guide to Rotational Moulding, 2003, Chapter 1.
State Intellectual Property Office of the People's Republic of China; Notification of First Office Action issued in application No. 201380037892.6; Aug. 31, 2015, Beijing, China.
State Intellectual Property Office of the People's Republic of China, Office Action issued in Application No. 201380034067.0, Mar. 3, 2016, 7 pages, Beijing, China.
State Intellectual Property Office of the People's Republic of China; First Office Action issued in application No. 201380037899.8; Oct. 29, 2015; 5 pages; Beijing, China.
State Intellectual Property Office of the People's Republic of China; First Office Action issued in application No. 201380034064.7, Nov. 3, 2015; 7 pages; Beijing, China.
State Intellectual Property Office of the People's Republic of China; Notification of First Office Action issued in Application No. 201380034124.5; Dec. 16, 2015; 15 pages; Beijing, China.
Taylor, Alan and Jansen, Malcolm L., "Solvent Extraction Mixer-Settler Design", Intl. Project Dev. Services Ltd., ALTA Free Paper, 10 pgs.
United States Patent and Trademark Office, Office action issued in U.S. Appl. No. 14/407,187, Jun. 14, 2016, 8 pages, USPTO, Alexandria, VA.
United States Patent and Trademark Office, Office action issued in U.S. Appl. No. 14/408,711, Jun. 17, 2016, 11 pages, USPTO, Alexandria, VA.
State Intellectual Property Office of the People's Republic of China, Notification of the Second Office Action issued in Application No. 201380034064.7, Aug. 15, 2016, 16 pages, Beijing, China.
European Patent Office; Extended European Search Report, issued in European Application No. 13810326.2, dated Sep. 29, 2016; 11 pages; Helsinki, Finland.

\* cited by examiner

SOLVENT EXTRACTION SETTLER ARRANGEMENT

This is a national stage application filed under 35 USC 371 based on International Application No. PCT/FI2013/050640, filed Jun. 12, 2013 and claims priority under 35 USC 119 of Finnish Patent Application No. 20125717 filed Jun. 26, 2012.

FIELD OF THE INVENTION

The present invention relates to a solvent extraction settler arrangement adapted for hydrometallurgical liquid-liquid extraction processes.

BACKGROUND OF THE INVENTION

As disclosed in e.g. publications WO 97/40899 and WO 97/40900 a solvent extraction settler arrangement is known which is adapted for hydrometallurgical liquid-liquid extraction processes and which typically comprises a mixing unit for preparing a dispersion from mutually immiscible solutions. A settler is arranged to separate solution phases from a dispersion fed from the feed end while the dispersion flows towards the discharge end of the settler. Elongated discharge launders are arranged at the discharge end of the settler to receive from the settler and discharge each solution phase that is separated from the dispersion in the settler. Each discharge launder includes a first end to which an outlet is arranged and a closed second end.

In the known technology the discharge launder has a same cross-sectional shape along the entire length of the discharge launder. In operation, as the launder collects solution flows of the solution from the settler along its entire length, and the whole volume is discharged from the launder from the outlet at the first end of the launder, the flow volume increases gradually along the length of the launder as the flow propagates towards the outlet. The discharge launder with a uniform cross-section is normally designed for the greatest flow volume to achieve a certain flow rate. The flow volume is greatest adjacent to the outlet and therefore the cross-section of the discharge launder is optimal only at a very short range of the launder.

In a launder with a constant cross-section the flow rate is lower at positions which are distant from the outlet in relation to other positions which are nearer the outlet whereby standing flow zones and eddies may occur. If the solution contains solids, crud accumulation may occur in these areas of standing zones and eddies. One disadvantage of the constant cross-section of the launder is also that the structure of the launder includes an excess of material which actually would not be needed.

OBJECT OF THE INVENTION

The object of the invention is to eliminate the disadvantages mentioned above.

In particular, it is the object of the invention to provide a settler arrangement having a discharge launder, the structure of which may be built with a lesser amount of material than the discharge launders of prior art.

Further, it is the object of the invention to provide a settler arrangement with discharge launders in which the flow rate is constant so that standing zones and eddies, and crud accumulation caused by such nonuniform flow, do not occur.

SUMMARY OF THE INVENTION

According to an aspect of the invention, the present invention provides a solvent extraction settler arrangement adapted for hydrometallurgical liquid-liquid extraction processes. The settler arrangement comprises a settler having a feed end and a discharge end. The settler is arranged to separate solution phases from a dispersion fed from the feed end while the dispersion flows to the discharge end. Elongated discharge launders are arranged at the discharge end of the settler for collecting and discharging each solution phase to be separated from the dispersion. Each discharge launder includes a first end, an outlet arranged at the first end, and a closed second end.

In accordance with the invention at least one of the discharge launders has a form of a conical tube with a cross-section converging from the first end towards the second end, and an inclined bottom descending from the second end towards the first end.

The advantage of the invention is that, due to the conical form of the discharge launder, the cross-section is optimal for the flow rate at each point along the length of the discharge launder. The flow rate remains constant and no standing flow zones and eddies occur. Crud accumulation is small and thus the need for interrupting the process to remove the crud will be reduced. Due to the conical shape, material costs are also reduced in the manufacturing of the discharge launder. The first and second discharge launders are tubular closed compartments which have many advantages. As an essentially closed structure, the inner atmosphere of the launders can be isolated from the outer atmosphere so that mist emissions cannot escape from the interior of the launders to contaminate the air and worsen the working conditions. Likewise, the surrounding air and e.g. insects and birds cannot enter the launders. In addition, when the lighter solution is an organic phase, the oxidation degree of the organic phase decreases, whereby solution costs are reduced.

In one embodiment of the settler arrangement, the discharge launders include a first discharge launder for receiving a separated lighter solution phase as an overflow from the settler, and for discharging the lighter solution phase to a first outlet located at the first end of the first discharge launder.

In one embodiment of the settler arrangement, the discharge launders include a second discharge launder arranged beside and in parallel with the first discharge launder for receiving a separated heavier solution phase from the settler as an underflow, and for discharging the heavier solution phase to a second outlet at the first end of the second discharge launder.

In one embodiment of the settler arrangement, at least one of the first discharge launder and the second discharge launder is a hollow body made of a fibre-reinforced plastic composite and manufactured by filament winding technology.

In one embodiment of the settler arrangement, at least one of the first discharge launder and the second discharge launder is a hollow body made of steel.

In one embodiment of the settler arrangement, the settler arrangement comprises a plurality of first outlet pipes arranged along the length of the first discharge launder at a distance from each other, each first outlet pipe having a third end opening to the settler to receive the lighter solution phase as an overflow from the settler, and a fourth end opening to the inner space of the first discharge launder.

In one embodiment of the settler arrangement, the arrangement comprises a plurality of second outlet pipes arranged along the length of the second discharge launder at a distance from each other, each second outlet pipe having a fifth end opening to the settler to receive the heavier solution phase as an underflow from the settler, and a sixth end opening to the inner space of the second discharge launder at the bottom of the second discharge launder.

In one embodiment of the settler arrangement, the arrangement comprises a level control valve connected to the sixth end of each second outlet pipe inside the second discharge launder.

In one embodiment of the settler arrangement, the level control valve comprises an extendable and collapsible tube member, such as a bellows tube, having a lower end connected to the sixth end of the second outlet pipe, and an upper end; an overflow lip attached at the upper end of the tube member; and an actuator connected to the overflow lip for vertical adjustment of the height position of the overflow lip.

In one embodiment of the settler, the settler consists of one tank having a single uniform flow space; and that all first and second outlet pipes open to said single flow space.

In one embodiment of the settler, the settler is divided into a plurality of mutually separated elongated parallel settler sections each extending from the feed end to the discharge end and forming a plurality of parallel flow spaces. At least one first outlet pipe and at least one second outlet pipe are connected to each settler section.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
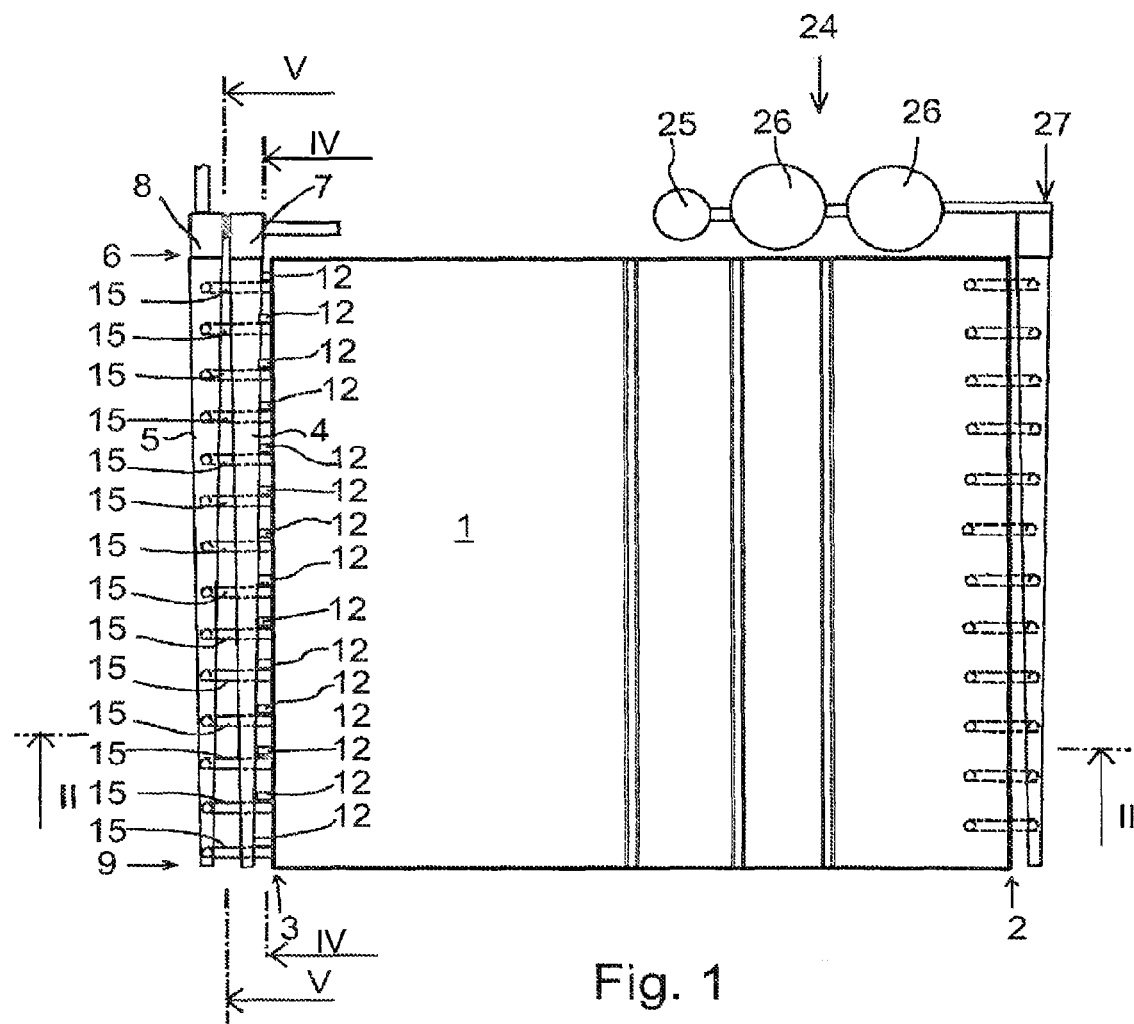
FIG. 1 shows a plan view of a settler arrangement according to a first embodiment of the invention.
Figure 2:
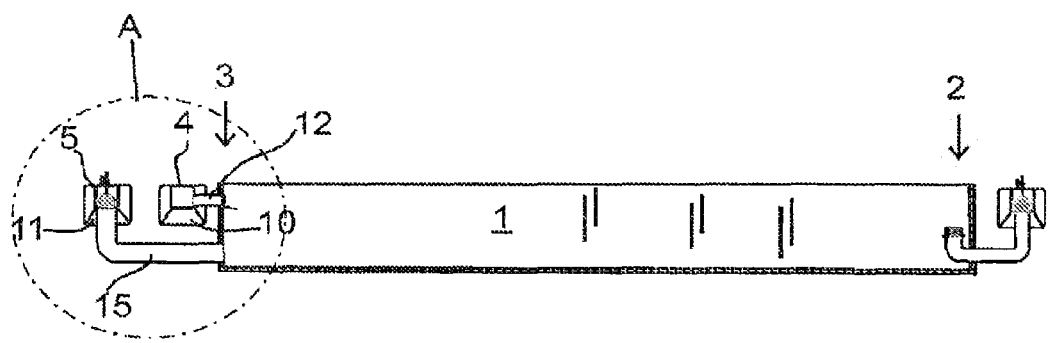
FIG. 2 shows a section II-II from FIG. 1.
Figure 3:
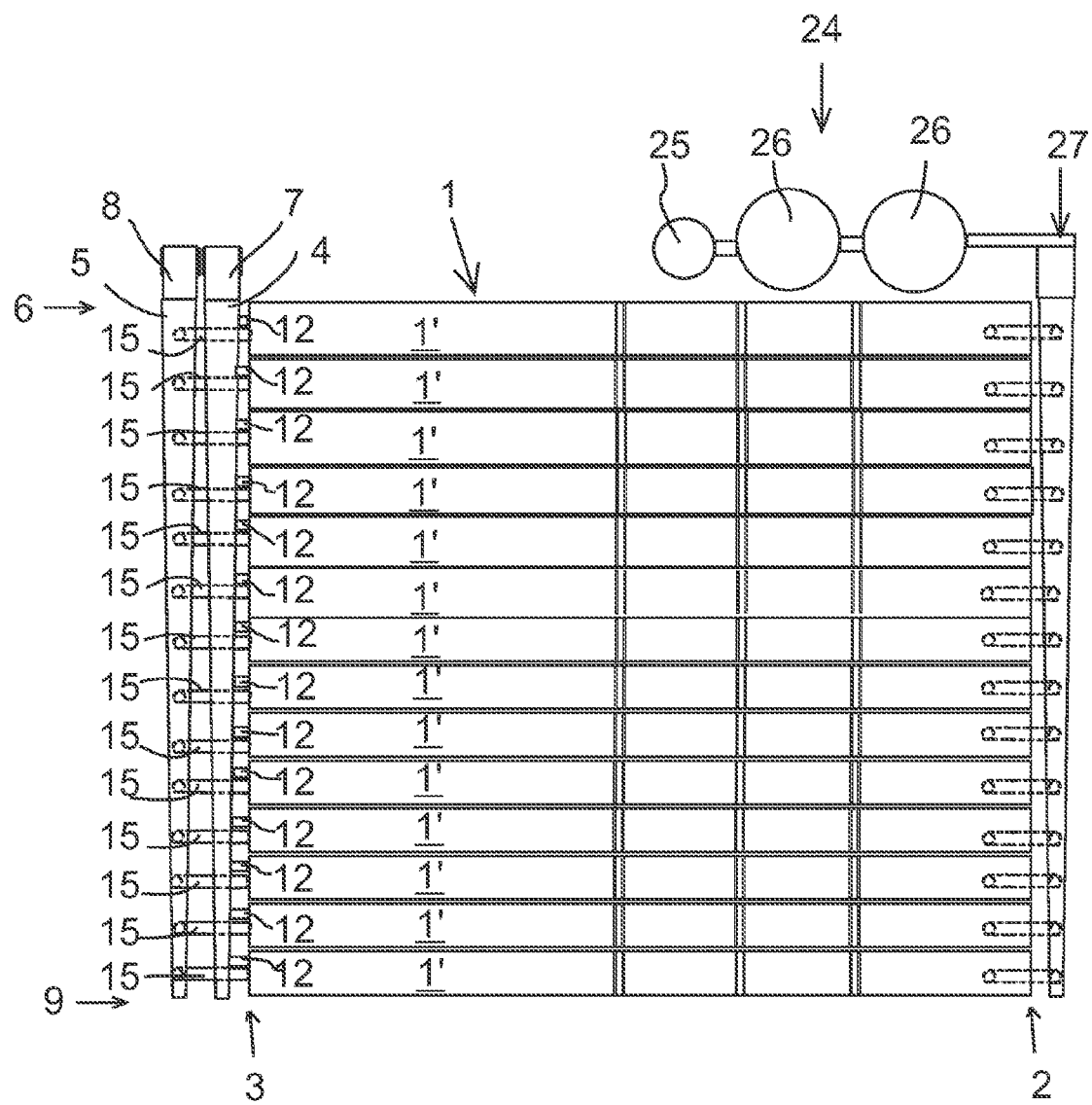
FIG. 3 shows a plan view of a settler arrangement according to a second embodiment of the invention.
Figure 4:
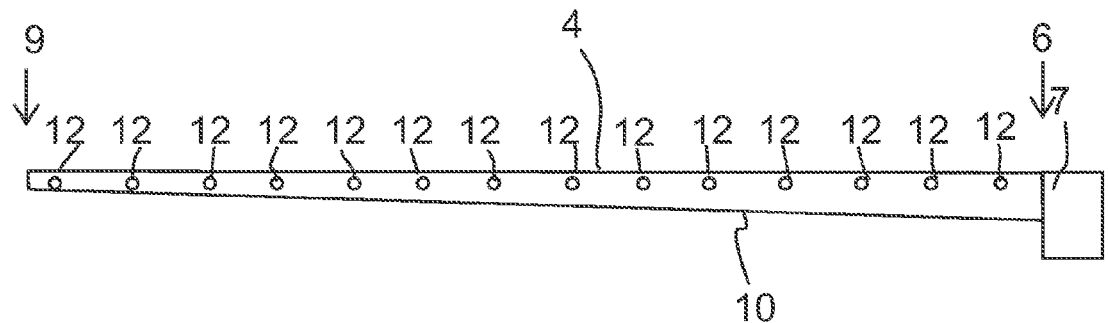
FIG. 4 shows a section IV-IV from FIG. 1.
Figure 5:
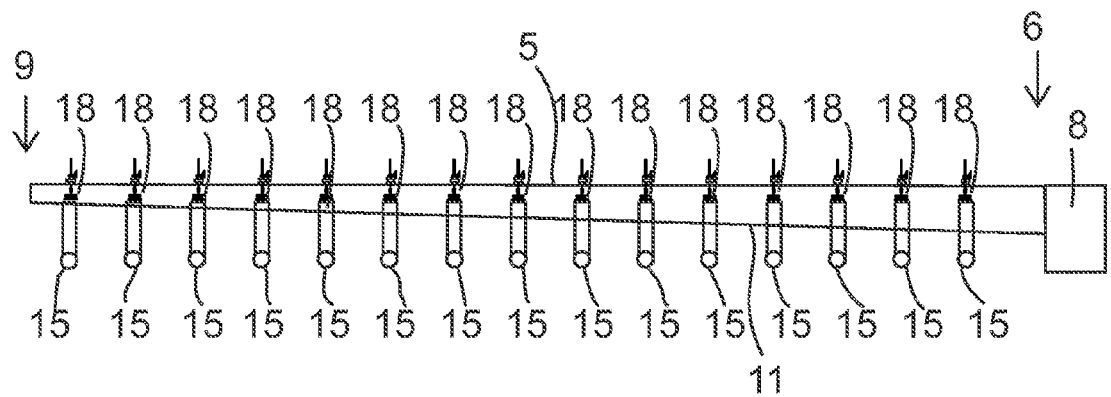
FIG. 5 shows a section V-V from FIG. 1.

FIGS. 1 and 3 show solvent extraction settler arrangements which are adapted for hydrometallurgical liquid-liquid extraction processes.

The settler arrangement comprises a mixing unit 24 for preparing a dispersion from mutually immiscible solutions. The mixing unit 24 includes, in this case, a pumping unit 25 and two mixers 26. A settler 1 is arranged to separate solution phases from a dispersion which is fed from the feed end 2 while the dispersion flows towards the discharge end 3. A feeding device 27 is arranged at the feed end 2 for feeding the dispersion prepared by the mixing unit 24 to the settler 1.

Elongated discharge launders 4 and 5 are arranged at the discharge end 3 to collect and discharge the separated solutions. Each discharge launder 4, 5 includes a first end 6, an outlet 7, 8 arranged at the first end 6, and a closed second end 9.

As can be seen in FIGS. 1, 2, 4 and 5, both discharge launders 4, 5 have a form of a conical tube with a cross-section converging from the first end 6 towards the second end 9 and an inclined bottom 10, 11 descending from the second end 9 towards the first end 6. The discharge launders 4, 5 have a form of a conical tube which has substantially a form of a square pyramid with cambered edges.

The discharge launders include a first discharge launder 4 for receiving a separated lighter solution phase (typically organic solution phase) as an overflow from the settler 1. The first discharge launder 4 discharges the lighter solution phase to a first outlet 7 located at the first end 6 of the first discharge launder 4.

The discharge launders further include a second discharge launder 5 arranged beside and in parallel with the first discharge launder 4 for receiving a separated heavier solution phase (typically aqueous solution phase) from the settler 1 as an underflow. The second discharge launder 5 discharges the heavier solution phase to a second outlet 8 at the first end 6 of the second discharge launder.

Figure 6:
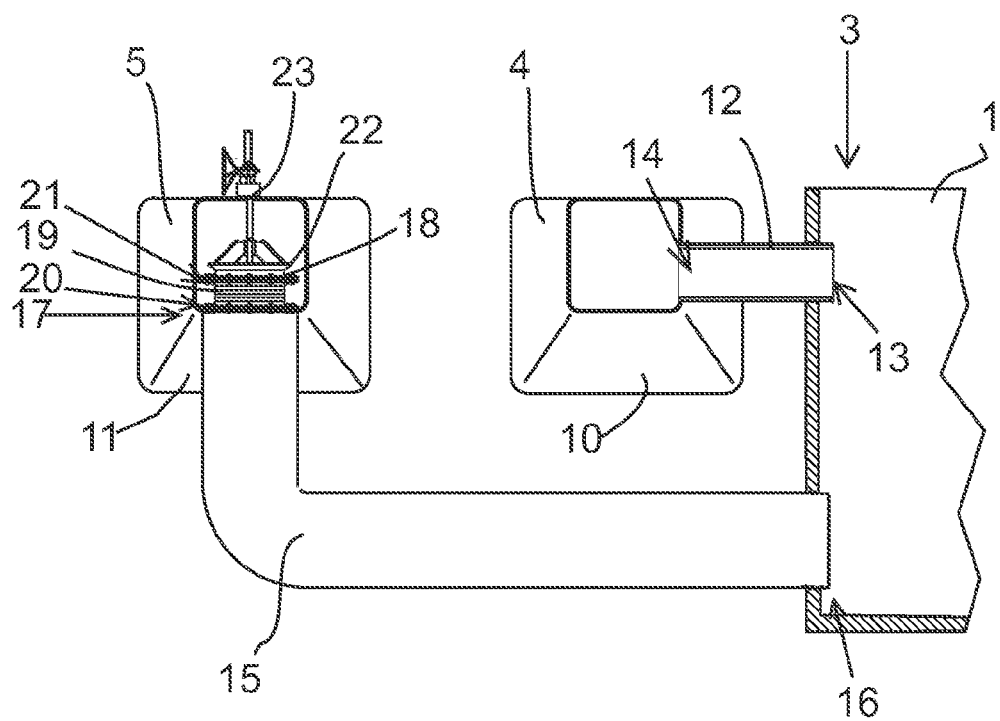
FIG. 6 shows an enlarged detail A from FIG. 2, FIGS. 7 and 8 show a level control valve in two positions.
Figures 7, 8:
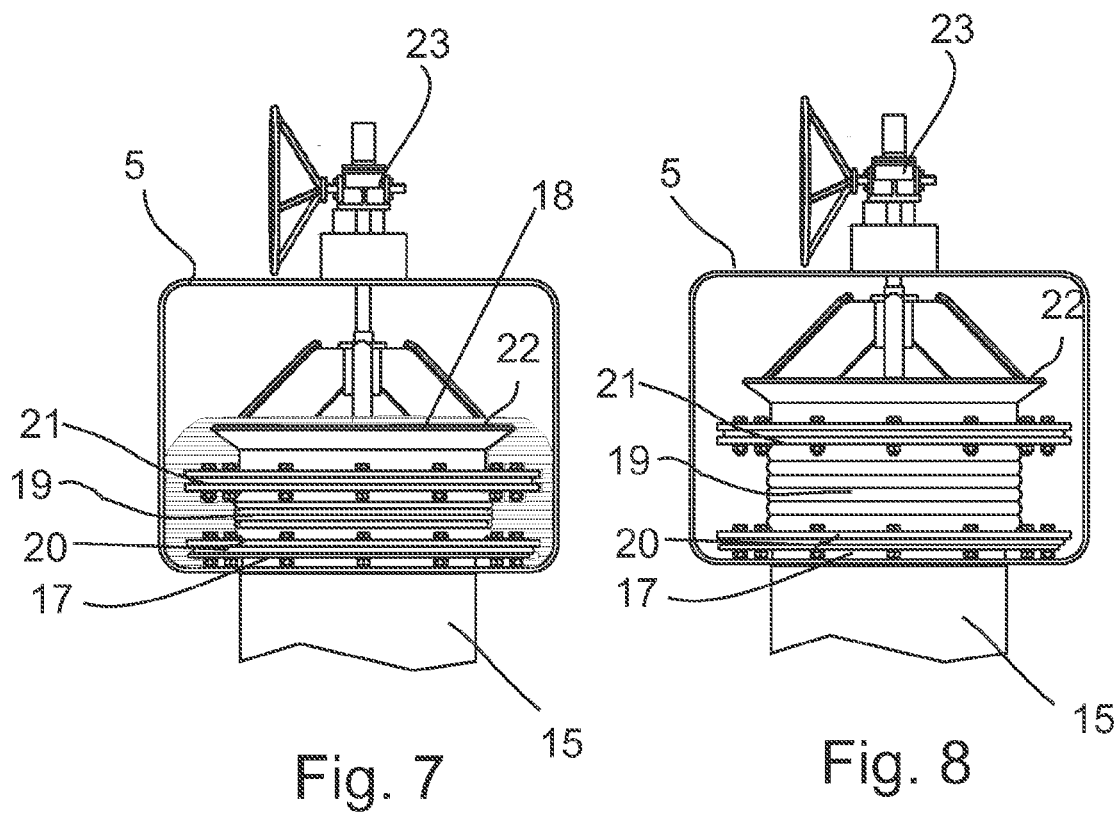

Preferably the first discharge launder 4 and the second discharge launder 5 are hollow bodies made of a fibre-reinforced plastic composite and manufactured by filament winding technology. As can be seen in FIGS. 6 to 8, the cross-section of the discharge launders is substantially rectangular with cambered corners. Such a form allows it to be easily detached from the mandrel on which it is wound.

A plurality of first outlet pipes 12 are arranged along the length of the first discharge launder 4 at a distance from each other. Each first outlet pipe 12 has a third end 13 which opens to the settler 1 to receive the lighter solution phase as an overflow from the settler 1. A fourth end 14 of each first outlet pipe 12 opens to the inner space of the first discharge launder 4 to conduct the lighter solution phase to the first outlet pipe.

A plurality of second outlet pipes 15 are also arranged along the length of the second discharge launder 5 at a distance from each other. Each second outlet pipe 15 has a fifth end 16 which opens to the settler 1 to receive the heavier solution phase as an underflow from the settler 1. A sixth end 17 of each second outlet pipe 15 opens to the inner space of the second discharge launder 5 at the bottom 11 of the second discharge launder to conduct the heavier solution phase to the second discharge launder.

In the embodiment shown in FIG. 1 the settler 1 consists of one large tank which has a single uniform flow space which extends widthwise over the whole area of the tank and lengthwise from the feed end 2 to the discharge end 3. In this case, all first and second outlet pipes 12, 15 open to said single flow space.

In the embodiment shown in FIG. 3 the settler 1 consists of a plurality of widthwise mutually separated elongated parallel settler sections 1' each extending from the feed end 2 to the discharge end 4 and forming a plurality of parallel flow spaces. At least one first outlet pipe 12 and at least one second outlet pipe 15 are connected to each settler section 1'.

As shown in FIGS. 6 to 8, the arrangement comprises a level control valve 18 connected to the sixth end 17 of each second outlet pipe 15 inside the second discharge launder 5. The level control valve 18 comprises an extendable and collapsible tube member 19, such as a bellows tube, having a lower end 20 connected to the sixth end 17 of the second outlet pipe 15. An overflow lip 22 is attached at the upper end 21 of the tube member 19. An actuator 23 is connected to the overflow lip for vertical adjustment of the height position of the overflow lip.

FIG. 7 shows the level control valve 18 in a position in which the overflow lip 22 is adjusted to a certain level which determines the level of the heavier phase in the settler. The heavier solution flows from the second outlet pipe 15 over the overflow lip 22 into the inner space of the second discharge launder 5.

FIG. 8 shows the level control valve 18 being adjusted so that the overflow lip 22 is at a higher position than in FIG. 7.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A solvent extraction settler arrangement adapted for hydrometallurgical liquid-liquid extraction processes, the settler arrangement comprising
    a settler having a feed end and a discharge end, said settler being arranged to separate solution phases from a dispersion fed from the feed end while the dispersion flows to the discharge end,
    first and second elongated discharge launders arranged at the discharge end of the settler, the first discharge launder collecting a separated lighter solution phase as an overflow from the settler and discharging the lighter solution phase to a first outlet, the second discharge launder collecting a separated heavier solution phase as an underflow from the settler and discharging the heavier solution phase to a second outlet, the second outlet having a terminal portion opening to the inner space of the discharge launder, each discharge launder including a first end, an outlet arranged at the first end, and a closed second end, characterized in that at least one of the discharge launders has a form of a conical tube with a cross-section converging from the first end towards the second end and an inclined bottom descending from the second end towards the first end; and
    a level control valve comprising:
        an extendable and collapsible tube member having a lower end rigidly connected to the terminal portion of the second outlet, and an overflow lip attached to an upper end of the tube member, and
        an actuator connected to the overflow lip capable of vertically adjusting the height of the overflow lip relative to the lower end.

2. The settler arrangement according to claim 1, where the first outlet is located at the first end of the first discharge launder.

3. The settler arrangement according to claim 2, where the second discharge launder is arranged beside and in parallel with the first discharge launder and the second outlet is located at the first end of the second discharge launder.

4. The settler arrangement according to claim 3, where the arrangement comprises a plurality of second outlet pipes arranged along the length of the second discharge launder at a distance from each other, each second outlet pipe having a fifth end opening to the settler to receive the heavier solution phase as an underflow from the settler, and a sixth end opening to the inner space of the second discharge launder at the bottom of the second discharge launder.

5. The settler arrangement according to claim 4, where a respective level control valve is connected to the sixth end of each second outlet pipe inside the second discharge launder.

6. The settler arrangement according to claim 4, where the settler consists of one tank having a single uniform flow space; and where all first and second outlet pipes open to said single flow space.

7. The settler arrangement according to claim 4, where the settler is divided into a plurality of mutually separated elongated parallel settler sections each extending from the feed end to the discharge end and forming a plurality of parallel flow spaces; and where at least one first outlet pipe and at least one second outlet pipe are connected to each settler section.

8. The settler arrangement according to claim 2, where the settler arrangement comprises a plurality of first outlet pipes arranged along the length of the first discharge launder at a distance from each other, each first outlet pipe having a third end opening to the settler to receive the lighter solution phase as an overflow from the settler, and a fourth end opening to the inner space of the first discharge launder.

9. The settler arrangement according to claim 1, where at least one of the first discharge launder and the second discharge launder is a hollow body made of a fibre-reinforced plastic composite and manufactured by filament winding technology.

10. The settler arrangement according to claim 1, where at least one of the first discharge launder and the second discharge launder is a hollow body made of steel.

11. The settler arrangement according to claim 1, where the level control valve comprises a bellows.

* * * * *